United States Patent [19]

Short

[11] Patent Number: 5,464,175
[45] Date of Patent: Nov. 7, 1995

[54] VARIABLE CAMBER VANE

[75] Inventor: Malcolm Short, Bristol, England

[73] Assignee: Rolls-Royce PLC, London, England

[21] Appl. No.: 203,941

[22] Filed: Mar. 1, 1994

[30] Foreign Application Priority Data

Mar. 13, 1993 [GB] United Kingdom ............... 9305210

[51] Int. Cl.⁶ .................................................. B64C 15/02
[52] U.S. Cl. ................... 244/12.5; 244/23 D; 244/219; 239/265.19
[58] Field of Search ................... 244/12.5, 23 D, 244/51, 52, 219; 60/230; 239/265.27, 265.29, 265.19, 265.25, 265.39, 265.43

[56] References Cited

U.S. PATENT DOCUMENTS

| 2,010,549 | 8/1935 | Maring ........................... 244/219 |
| 2,879,014 | 7/1957 | Smith et al. . |
| 3,704,828 | 12/1972 | Studer et al. . |
| 4,071,207 | 1/1978 | Piasecki et al. .................. 244/12.5 |

FOREIGN PATENT DOCUMENTS

| 527624 | 10/1921 | France ........................... 244/219 |
| 893054 | 4/1962 | United Kingdom . |
| 1018581 | 1/1966 | United Kingdom . |
| 1413562 | 11/1975 | United Kingdom . |
| 1481497 | 7/1977 | United Kingdom . |

*Primary Examiner*—Galen L. Barefoot
*Attorney, Agent, or Firm*—Oliff & Berridge

[57] ABSTRACT

A variable camber vane comprises a plurality of articulated spanwise segments which can be operated by a mechanism of pivoted links at one end. A plurality of such vanes may be arranged in a supporting frame to act a variable thrust deflector for the exhaust of a lift engine. In a VTOL or STOVL aircraft installation the vane array is mounted on the underside of the aircraft below a downwardly exhausting lift fan and the range of movement of the variable vane array is used to vector lift thrust between a mainly downward direction and a direction having a substantially rearward component.

9 Claims, 3 Drawing Sheets

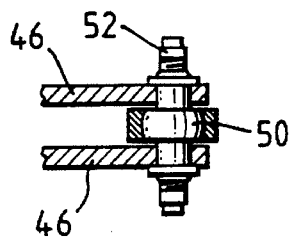
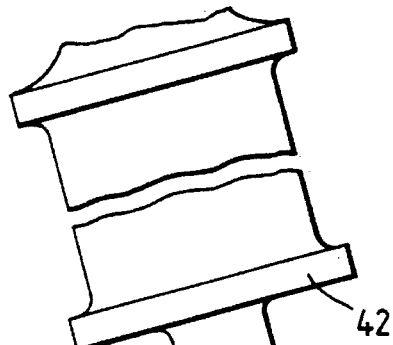
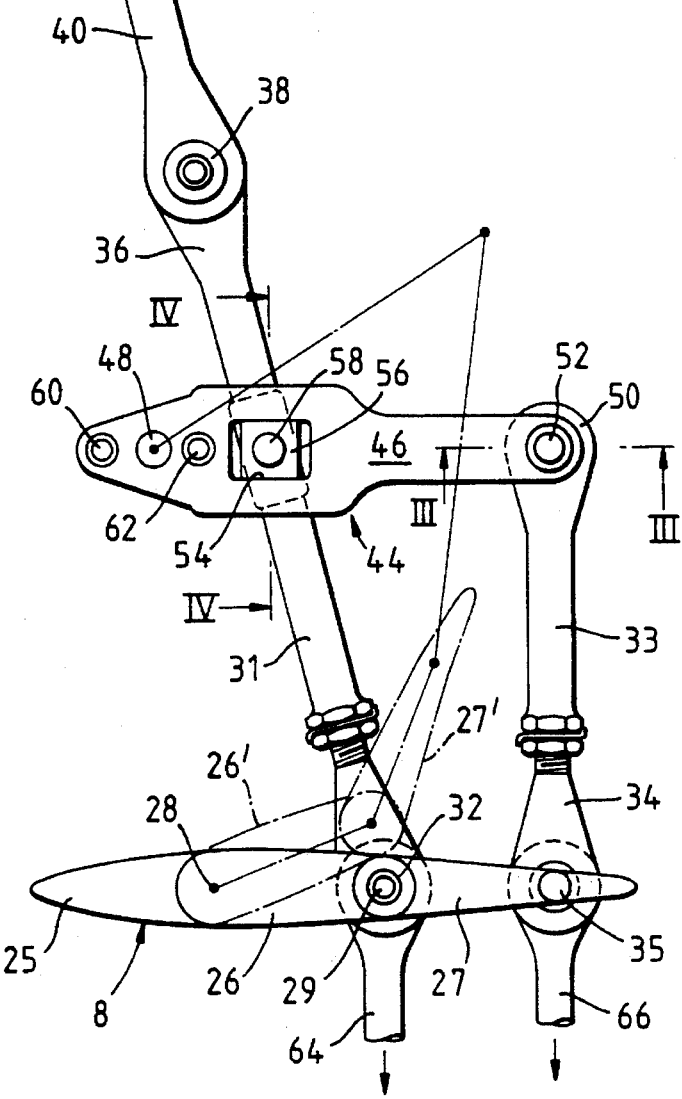

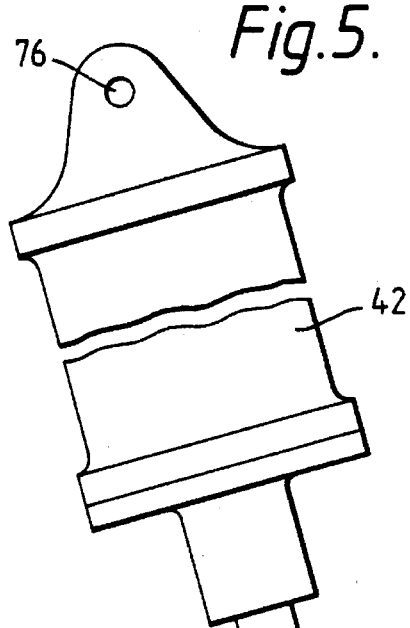
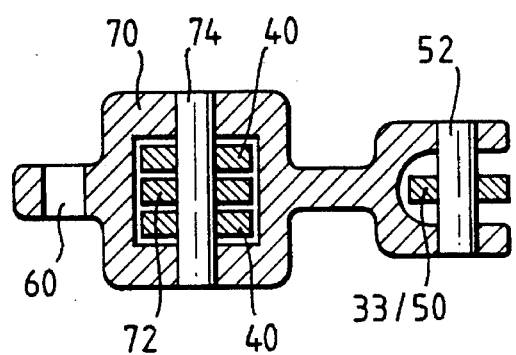
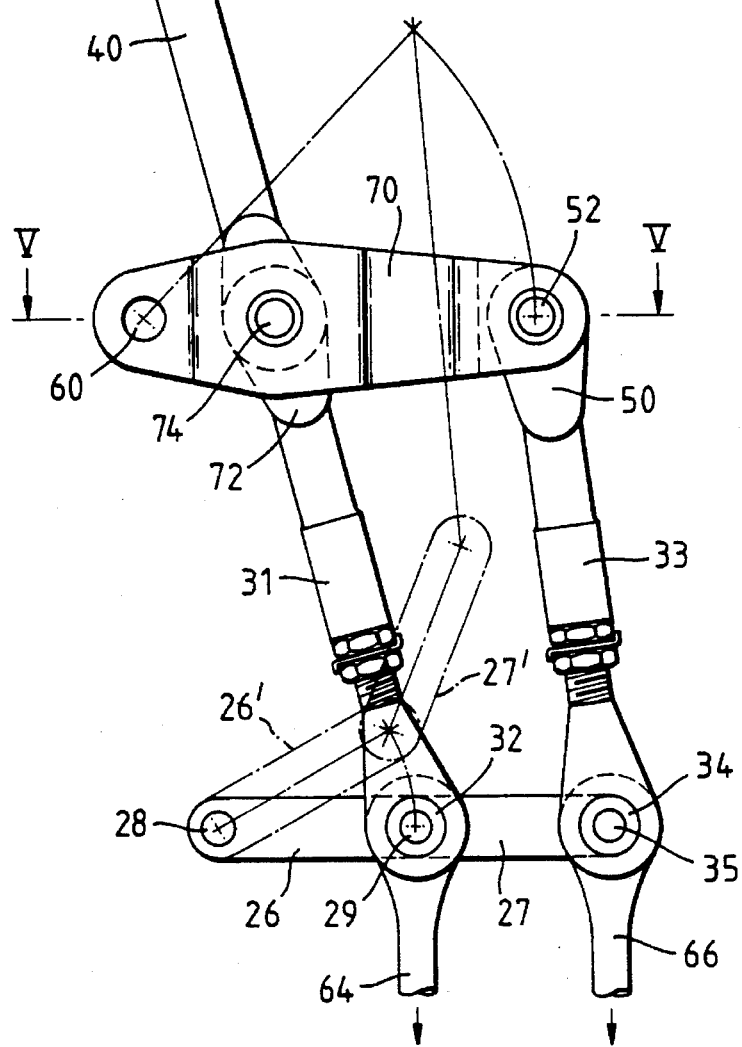

VARIABLE CAMBER VANE

FIELD OF THE INVENTION

The invention relates to variable camber vanes. In particular it concerns a mechanism for varying the camber of vanes in an aircraft engine nozzle.

BACKGROUND OF THE INVENTION

Vertical take-off and landing (VTOL) and short take-off and landing (STOL) aircraft may employ vectorable nozzles and deflect the flow and gas from the propulsion engine. The invention is concerned with aircraft of this kind in which the engine exit nozzles include an array or cascade of vanes to vector engine thrust.

A cascade nozzle of the kind referred to is the subject of co-pending U.S. patent application Ser. No. 08/084,706 filed Jun. 25, 1993 now U.S. Pat. No. 5,390,877, issued Feb. 21, 1995. In this arrangement a vane cascade or deflector array is pivotally mounted beneath a lift fan or lift engine to serve, in use, as means for vectoring lift thrust. An array of parallel vanes extends between opposite sides of a supporting frame. Each of the vanes has a smooth, one-piece surface made of flexible sheet material which are connected to pivoted levers at either end housed in the frame. Thus, by moving the levers the camber of the vanes may be changed without the use of hinged joints.

The present invention seeks to avoid the sliding abutment of the inner faces of the vane surfaces at the trailing edge of the vanes, and also to avoid the multiplicity of sliding interfaces in the mechanical link system interconnecting the vanes.

The object of the present invention is to provide a mechanism for changing the camber of multi-part vanes of the type referred to.

SUMMARY OF THE INVENTION

According to the present invention there is provided a variable camber vane comprising a plurality of chordwise extending members including a leading edge member, at least one intermediate chord-wise member hinged to said leading edge member, a trailing edge member hinged to said intermediate chord-wise member, and an operating linkage including a lever having a first end and a second end opposite the first end, the lever being pivotally mounted at the first end for arcuate movement, first connecting rod means connecting the intermediate chord-wise member to said lever at a point intermediate its first and second ends, second connecting rod means connecting the second end of the lever to the trailing edge member, and an actuator coupled to the lever to produce arcuate movement thereof, whereby movement of the lever by the actuator in one direction will vary the camber of the vane in one sense, and movement of the lever in the opposite direction will vary the camber of the vane in the opposite sense.

Preferably the actuator is a linear/actuator and the pivotal connection intermediate the ends of the lever may be provided by a pin or by a slide member slidable within a slot formed in the lever.

In a preferred form of the invention there is an array of guide vanes of this type which are interconnected for simultaneous camber change by means of a single mechanism. This array of variable camber vanes may be mounted in a nozzle or duct supplied with fluid from an aircraft propulsion engine. The invention and how it may be carried into practice will now be described, by way of example, with reference to the accompanying drawings in which:

BRIEF DESCRIPTION OF THE DRAWINGS

FIG. 2 illustrates a first embodiment of a mechanism for altering the camber of the vanes in the array, FIG. 3 is a cross-sectional view taken along the plane of section line III—III of FIG. 2, FIG. 4 is a cross-sectional view taken along the plane of section line IV—IV of FIG. 2, FIG. 5 illustrates a second embodiment which is a modified form of the mechanism of FIG. 2, and FIG. 6 is a cross-sectional on line V—V of FIG. 5.

DETAILED DESCRIPTION OF THE ILLUSTRATED EMBODIMENT

Figure 1:
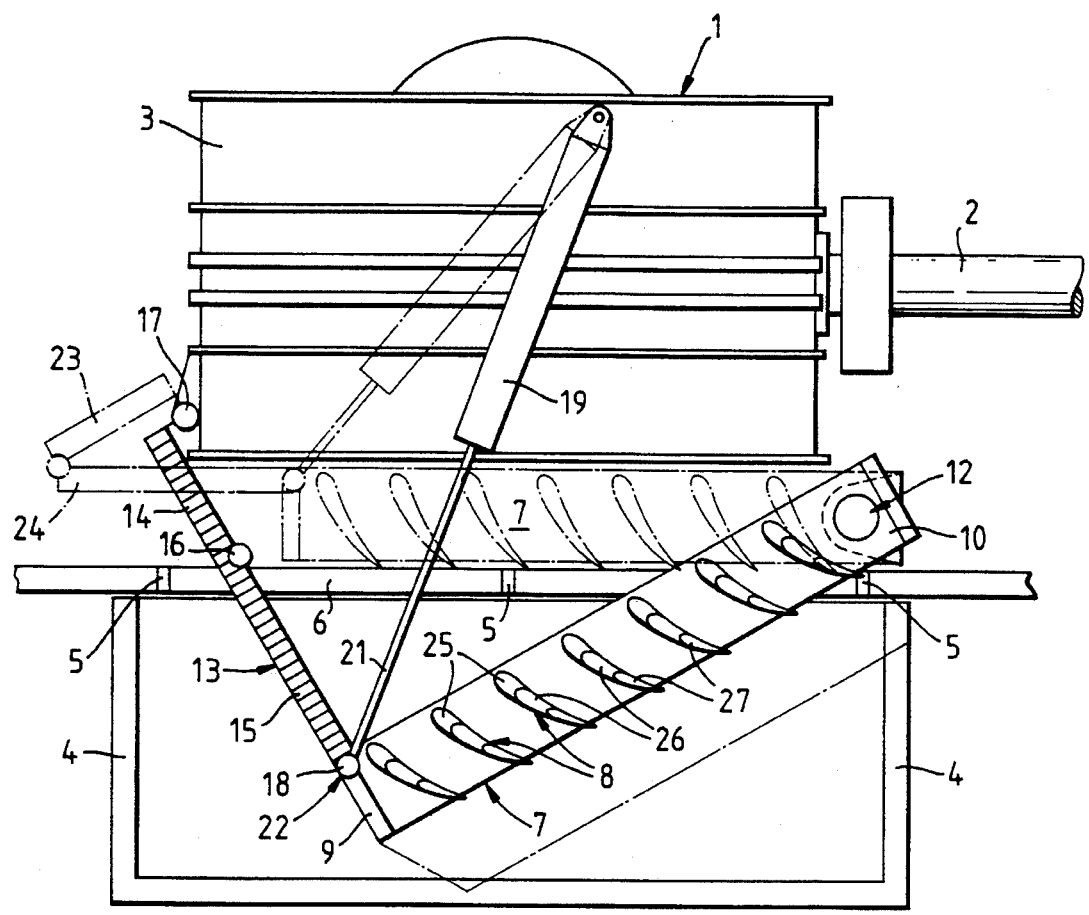
FIG. 1 illustrates a vectorable nozzle for a lift fan including an array of guide vanes.

Referring first to FIG. 1 there is shown at 1 a lift fan which is mounted in an aircraft fuselage with its rotational axis vertical so that the fan draws in air from above the fuselage and exhausts it in a downward direction through an aperture in the underside of the fuselage. In this particular example the fan is rotatably driven by shaft 2 which extends along the aircraft longitudinal axis from the main propulsion engine (not shown). The fan 1 is located within a generally cylindrical housing 3 which is housed in the aircraft fuselage, or possibly within a wing. The fan exhaust aperture on the underside of the fuselage is closeable by a pair of fairing doors 4 hinged to the fuselage underside at 5 and spaced apart laterally on opposite sides of the fan exit aperture. The doors 4 constitute side walls of the fan exit nozzle.

The lower face of cylindrical fan housing 3 is spaced from the lower fuselage skin, that is the doors 4, when in their closed position, and within the space thus created there is an array of nozzle vanes generally indicated at 7. This array comprises a plurality of variable camber vanes 8 mounted in a generally rectangular frame 9, a rear edge 10 of which is pivotally mounted at 12 to the aircraft fuselage. The opposite, forward side of rectangular frame 9 is supported by a folding door arrangement generally indicated at 13. This arrangement consists of two doors 14, 15 which extend across the lateral width of the nozzle between the pair of side doors 4 to form a forward nozzle defining face.

The two parts 14,15 of this folding door arrangement 13 are hinged together at 16 along their transverse abutting edges. The opposite upper edge of the upper door 14 is pivoted at 17 tangentially to the cylindrical fan housing 3. The lower transverse edge of lower door 15 is similarly pivoted at 18 to a forward edge of the nozzle frame 9. The folding door arrangement is deployed to its operating position, as shown by the solid lines in FIG. 1, by a linear stroke actuator 19 which has an extendable output shaft 21 pivotally connected at 22 to the nozzle frame 9. When the output shaft 21 is retracted the nozzle frame 9 is raised to the chain linked position shown in FIG. 1 and the doors 14,15 fold at pivot 16 into the chain link positions shown at 23,24. With the nozzle in the retracted position the fuselage doors may be closed, by means not shown, to reinstate the smooth underside of the fuselage.

With the nozzle in the deployed position, solid lines in FIG. 1, and the fan operating downwardly directed fan air is exhausted through the nozzle formed by the pair of fuselage doors 4, the deployed folding doors 14,15 and the array of guide vanes 8 within frame 9. Therefore, the thrust vector of the fan air may be altered by changing the camber of the vanes 8. The remaining drawings concern alternative mechanisms for achieving this.

Referring now to FIGS. 2, 3 and 4 there is shown an actuator mechanism for altering the camber of three part variable camber vanes. In the lower part of FIG. 2 there is shown a single variable camber vane 8 comprising a fixed leading edge part 25 (leading edge member) and pivotally attached thereto a mid-chord vane section 26 (intermediate chord-wise member) and a trailing edge vane section 27 (trailing edge member). The leading edge section 25 is fixed between opposite side members of nozzle frame 9 and the mid-chord section 26 is pivotally attached about a span-wise expanding axis 28 to the trailing edge of the leading section. The trailing edge vane section 27 is similarly attached about a span-wise extending axis 29 to the trailing edge of the mid-chord vane section 26.

The deflected position of the mid-chord and trailing edge vane sections are shown at 26', 27' respectively by a chain link lines in FIG. 2. The angular disposition of mid-chord vane section 26 relative to fixed leading edge section 25 is controlled by a rod 31 (first connecting rod means) one end 32 of which is journaled to carry the pivot 29 at the trailing edge of the mid-chord vane section. The angular disposition of the trailing edge vane section 27, relative to the mid-chord vane section 26, is similarly controlled by rod 33 (second connecting rod means) which has one end 34 pivotally attached at 35 towards the trailing edge of the trailing edge section 27. The first actuator rod 31 is the principle control member of the variable camber mechanism. Another end 36 of the rod 31 opposite first end 32 is pivotally connected at 38 to an output shaft 40 of an acutator 42. The motion of rod 31 is coupled to rod 33, with an inherent magnification factor, by means of pivoted lever arrangement generally indicated at 44.

The mechanism 44 comprises a lever 46 which is pivoted at 48 to a fixed axis in the aircraft frame and at its opposite end 50 is pivoted at 52 to one end of rod 33 opposite to the end 34 pivoted to the trailing edge vane section 27. Towards a mid point the lever 44 is connected with rod 31 by means of a sliding pivot. A lever 44 is formed with a rectangular aperture 54 the longitudinal sides of which are engaged by a slide block 56 which is in turn engaged by a pivot pin 58 carried by rod 31. Thus, as rod 31 is moved axially by actuator 42 this movement is transferred to arcuate movement of lever 46 and the sliding block 56 accommodates the non-circular movement of pin 58. The ratio of the distances of pins 52 and 58 from pivot 48 of lever 46 determines the angular magnification factor inherent in the pivotal movement of vane sections 26 and 27. The details shown in drawings FIG. 3 and FIG. 4 relate to the pivotal connections of lever 46 with rod 33 and rod 31 respectively.

The lever 46 may comprise a double lever, that is it consists of two parallel arms fixed relative to each other but which lie on opposite sides of the two connecting rods 31,33. The two parts of lever 46 may be riveted together at 60,62 on opposite sides of pivot 48 or they may be connected in some other secure manner, they could be formed integrally. In FIGS. 3 and 4 like parts carry like references.

So far the variable camber control mechanism has been described with reference only to a single variable camber vane. This vane may be regarded as a master vane and its movement may be transferred to the remaining, or slave, vanes in the nozzle vane array by means of drawbars 64,66 which extend the length of the whole vane array. The first drawbar 64 is interconnected with actuator rod 31 through a common coupling with pivot 29, and is connected with each vane through a coupling with the trailing edge of the mid-chord section, conveniently at the pivot of the trailing edge section. The mid-chord sections of all the vanes in the array are coupled to move in unison. Similarly, the second drawbar 66 interconnects the trailing edge sections of each of the vanes with rod 33 to control, in unison, the angular disposition of each of the trailing edge sections relative to its respective mid-chord section.

Referring now to FIGS. 5 and 6 there is shown an alternative arrangement for coupling the linear movement of actuator output rod 40 with the two vane actuating rods 31,33. In place of the lever 44, having a sliding block pivoted to rod 31, there is a lever 70, which is again pivoted to aircraft frame at 60, but which is now simply pivoted to both levers 31,33. As in the FIG. 2 arrangement lever 70 is pivoted at 52 to one end 50 of rod 33, the opposite end 34 of which is pivoted to the trailing edge vane section 27. The actuator output rod 40 is pivoted to one end 72 of a slightly shorter rod 31, and the pivot in 74 is journaled to the lever 70 for rotation movement only. In order to accommodate the locus of pivot 74 about the axis of pivot 60 on lever 70 the actuator 42 is now pivotally mounted at 76 in order that the actuator output rod 40 may track the curved locus of pivot 74.

The cross-sectional view of FIG. 6 shows a section through lever 70 bisecting the three pivots 52,60 and 74. Again, the parts illustrated which correspond to like parts in FIG. 5 carry like references.

Coordinated movement of all of the vanes in the array is achieved by the same drawbar arrangement as described with reference to FIG. 2. Also, in both arrangements the vane actuating mechanism is mounted on the frame 9. The actuator 42, at least in the form described in the above embodiments, is preferably also mounted on the frame. This need not be the case, however, if some form of flexible drive is substituted for actuator output rod 40 in FIGS. 2 and 5.

I claim:

1. A variable camber vane comprising
   a plurality of chordwise extending members including
      a leading edge member,
      at least one intermediate chord-wise member hinged to said leading edge member,
      a trailing edge member hinged to said intermediate chord-wise member, and
   an operating linkage including
      a lever having a first end and a second end opposite the first end, the lever being pivotally mounted at the first end for arcuate movement, and formed with a slot intermediate the first and second ends,
      first connecting rod means connecting the intermediate chord-wise member to said lever at a point intermediate its first and second ends, and carrying a slide member which is slidably engaged with the slot formed in the lever to provide a pivoted connection therewith,
      second connecting rod means connecting the second end of the lever to the trailing edge member, and an actuator coupled to the lever to produce arcuate movement thereof, whereby movement of the lever by the actuator in one direction will vary the camber of the vane in one sense, and movement of the lever in the opposite direction will vary the camber of the vane in the opposite sense.

2. A variable camber vane as claimed in claim 1 wherein the first connecting rod means is connected to the intermediate chord-wise member towards its trailing edge and the second connecting rod means is connected to the trailing edge member towards its trailing edge.

3. A variable camber vane as claimed in claim 1 wherein the actuator comprises a linear stroke actuator having an output member moveable axially in a first direction to vary the camber of the vane and in the reciprocal direction to vary the camber of the vane in the opposite sense.

4. A vectorable exhaust nozzle for a vectored thrust aircraft including in the exhaust of a lift means a variable camber vane as claimed in claim 1.

5. A variable camber vane as claimed in claim 1, wherein said slide member acts as a bearing for a pivot pin carried by said first connecting rod means.

6. Exhaust deflector means comprising a plurality of variable camber vanes mounted in a supporting frame and spaced apart from each other in a parallel array, each variable camber vane comprising a plurality of chordwise extending members including a leading edge member, at least one intermediate chord-wise member hinged to said leading edge member, a trailing edge member hinged to said intermediate chord-wise member, and an operating linkage including a lever having a first end and a second end opposite the first end, the lever being pivotally mounted at the first end for arcuate movement, and formed with a slot intermediate the first and second ends, first connecting rod means connecting said lever at a point intermediate its first and second ends to each of the vane intermediate chord-wise members in turn, said first connecting rod means carrying a slide member which is slidably engaged with the shot formed in the lever to provide a pivotal connection therewith, second connecting rod means connecting the second end of the lever to each of the vane trailing edge members in turn, and an actuator coupled to the lever to produce arcuate movement thereof, whereby movement of the lever by the actuator will vary the camber of all of the vanes in unison.

7. An exhaust deflector means as claimed in claim 6 wherein said plurality of variable camber vanes is mounted to alter the direction of thrust of the exhaust.

8. An exhaust deflector means as claimed in claim 7 mounted in an aircraft thrust deflector system.

9. A vectorable exhaust nozzle for a vectored thrust aircraft including in the exhaust of a lift means an exhaust deflector means as claimed in claim 6.

* * * * *